UNITED STATES PATENT OFFICE.

CURTIS GRANT EDWARDS, OF PLAIN CITY, OHIO, ASSIGNOR OF TWO-THIRDS TO SHERMAN E. EDWARDS, OF SAME PLACE, AND EDWIN BOOTH, OF CINCINNATI, OHIO.

WOOD-FILLER COMPOSITION.

SPECIFICATION forming part of Letters Patent No. 553,209, dated January 14, 1896.

Application filed May 15, 1893. Serial No. 474,325. (No specimens.)

*To all whom it may concern:*

Be it known that I, CURTIS GRANT EDWARDS, a citizen of the United States, residing at Plain City, in the county of Madison and State of Ohio, have invented certain new and useful Improvements in Wood-Filler Compositions; and I do hereby declare that the following is a full, clear, and exact description of the invention, which will enable others skilled in the art to which it appertains to make and use the same.

My invention relates to that class of compositions of matter which are used for filling the pores in the grains of different kinds of wood preparatory to finishing with paint or varnish; and the object of my invention is to provide a new and useful wood-filler composition which will be adapted for effective use upon various kinds or varieties of natural woods and which will serve to bring out more prominently the grain in the wood, which will beautify the appearance of the same, and which will furthermore render the surface thus treated hard, smooth, and impervious to paints, oils and varnishes, whereby only one coat of paint or varnish need be applied to finish the wood with a smooth and glossy surface.

My improved wood-filler composition is formed of the following ingredients, combined in substantially the relative proportions stated: linseed-oil, twenty-four ounces; liquid drier, thirty ounces; varnish, fourteen ounces; pulverized silicious clay, (Pennsylvania,) eleven and one-half pounds. The herein-set-forth pulverized highly-silicious earth or clay contains approximately and relatively 68.80 per cent. of silica, 3.17 per cent. of moisture, and 28.03 per cent. consisting most of alumina with traces of iron oxide, lime, and magnesia, a part of the silica being in a free state. The proportion in which this highly-silicious earth or clay is used is eleven and one-half pounds.

By reason of the relative proportions in which the ingredients are used, as above set forth, and the peculiar characteristics and proportion of elements of the herein-set-forth highly-silicious earth or clay, a more effective and perfect result is attained than with whiting or "china-clay," ordinary "brown" clay, or the ordinary clays containing a minute percentage of silica, as heretofore employed in wood-filler compounds.

Owing to the peculiar nature and characteristics and relative proportion of elements in the herein-set-forth highly-silicious earth or clay, in relation to the proportions of the other ingredients comprised in my improved wood-filler compound, I am enabled to secure a highly-effective finish with but one coat of varnish in my invention. Several coats of varnish are usually employed in connection with ordinary wood-fillers comprising ordinary clay or whiting.

The high percentage of silicates and aluminum, besides resulting in the production of a better finish to the wood with but one coat of varnish, impart an exceedingly-light weight to the main ingredient of my improved compound, (the herein-set-forth highly-silicious earth or clay,) which prevents the settling of the latter to the bottom of the composition and results in the uniform intermixture of the ingredients, so that when my improved filler is used the proportions of the various ingredients are equalized and the pores of the wood receive the proper proportion of the different ingredients.

As ordinarily compounded with the common forms of clay or whiting, as above set forth, wood-fillers have been open to the disadvantage that the relative weight of such main ingredients cause the latter to sink to the bottom of the composition, thus entailing material disadvantages in the use and application of the filler.

This silicious clay or earth as taken from the ground is subject to the following process: It is first placed in vats or other suitable vessels and soaked in water. The soaked mass is then crushed and afterward placed in suitable kilns and baked. When it is thus baked and hardened the mass of silicious clay or earth has a "silver-white" color. The hardened and baked mass is finally pulverized by grinding or in any other suitable manner, and the pulverized dust or residue is then intermixed with the other ingredients forming my improved filler.

The foregoing ingredients are thoroughly intermixed by agitation or in any other suitable manner, and when combined in the proportions above set forth form one gallon of my improved wood-filler composition. When the above ingredients are intermixed the resulting composition forms a thick liquid or paste.

The manner of applying or using my improved wood-filler composition is as follows: The surface of the wood is first rendered smooth by planing, sand-papering, or in any other suitable manner. The composition is then applied to the surface of the wood with a brush and allowed to stand from ten to fifteen minutes or until the filler has a dull appearance. The surface is then wiped or rubbed in a direction at an angle to the grain of the wood with some suitable material, preferably "excelsior," after which the surface is wiped or rubbed in an opposite direction with a cloth or other suitable material. The wood or article thus treated is then permitted to stand about twelve hours, when it is ready to be finished with a single coat of paint or varnish.

In connection with the liquid composition formed by the foregoing ingredients I employ naphtha as a thinning ingredient in the proportion of about an equal part with relation to the bulk of liquid filler used.

My improved composition in its commercial form has a consistency approximating that of a very thick liquid or paste, and when used is designed to be thinned with naphtha, the composition being thus rendered thin enough to readily cover the grain of wood and to be easily worked. The evaporation of this thinning ingredient (naphtha) causes a dull appearance in from ten to fifteen minutes after the composition is applied, (the time varying according to the temperature of the room in which the work is done,) and the wiping or rubbing of the filler in the opposite directions is done after the filler assumes this dull appearance.

Under some circumstances I may prefer to also use balsam fir as an additional ingredient in connection with the main ingredients forming my improved wood-filler composition, as hereinbefore set forth, the relative proportion of the balsam fir to the other main ingredients being one-half ounce.

While my improved filler composition employs some ingredients which have been heretofore used in compositions of this nature, by reason of the peculiar nature and variety of the herein-set-forth pulverized highly-silicious earth or clay embodied in my improved compound, as well as the relative proportions in which the respective ingredients are intermixed and the process of preparing and compounding the same, a more perfect finish and more satisfactory result in the art are obtained by my improved filler over the compositions of this nature heretofore employed.

Wood surfaces treated as above set forth with my herein-described wood-filler composition afterward require only one coat of paint, varnish or other finishing composition to secure a bright gloss finish, owing to the fact that my wood-filler composition effectively operates to render the surface of the wood hard, smooth and impervious to paints, oils and varnishes.

Having thus described my invention, I claim and desire to secure by Letters Patent of the United States—

An improved wood filler compound, consisting of one hundred and eighty-four parts (ounces) of silica, and alumina with traces of iron oxide and lime and magnesia, combined in approximately the proportions of 68.80 per cent. of the silica, 28.03 per cent. of the alumina, and 3.17 per cent. of moisture; twenty-four parts (ounces) of linseed oil; thirty parts (ounces) of liquid drier; and fourteen parts (ounces) of varnish;—compounded in substantially the proportions set forth.

In testimony whereof I affix my signature in presence of two witnesses.

CURTIS GRANT EDWARDS.

Witnesses:
JOHN WILLIAMS,
ERVA PITCHER.